United States Patent Office 3,422,151
Patented Jan. 14, 1969

1

3,422,151
COMPOUNDS OF THE VITAMIN A SERIES
Josef Ferdinand Arens, Hilversum, and Lambert Brandsma, Jutphaas, Netherlands, assignors to Organon Inc., West Orange, N.J., a corporation of New Jersey
No Drawing. Filed Apr. 1, 1965, Ser. No. 444,842
Claims priority, application Netherlands, Apr. 17, 1964, 6404175
U.S. Cl. 260—611                      4 Claims
Int. Cl. C07c 41/06; C07c 43/18

ABSTRACT OF THE DISCLOSURE

New intermediates for the synthesis of vitamin A aldehyde are prepared by the addition of 1-lower alkoxy-3-methyl-hexa-1,3-dien-5-yne to beta-ionone according to a Grignard or Nef reaction, followed by partial reduction of the triple bond in the obtained addition product to a double bond. The resulting compounds are 1-alkoxy-7-hydroxy - 3,7-dimethyl-9-(2',6',6'-trimethyl-cyclohex-1'-ene-1'-yl)-nona-1,3,5,8-tetraenes. Conversion of the intermediate with an acid results in the formation of vitamin A aldehyde. In this way the aldehyde is obtained in only three reaction steps starting from beta-ionone.

The invention relates to a new synthesis of the above-mentioned compounds, especially of vitamin A aldehyde, by coupling β-ionone with a polyene and further conversions to obtain the desired final product.

The number of possibilities to synthesize vitamin A and allied compounds is very great. An important starting product is the β-ionone. In a number of processes the side-chain is gradually built up to the required length. Many methods for the lengthening with one or more carbon atoms of the chain of the β-ionone and the intermediate products obtained from it has been applied, see for instance "Advances in Organic Chemistry, Methods and Results" 4, 115–223 (1963). After lengthening of the chain the product formed can be converted, if required, into a product with vitamin A activity by partial hydrogenation, hydrolysis, dehydration and other processes.

One of the objectives of the inventors was the reduction of the number of reaction steps with the rather precious β-ionone or a compound with the β-ionylidene group in order to prepare the biologically active final product as economically as possible.

From the literature it is known that syntheses in which hydroxy compounds of the following grouping occur as intermediate product,

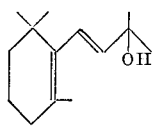

are generally deemed unfit for the preparation of vitamin A on a large scale, see O. Isler in "Advances in Organic Chemistry," 4, 193 (1963). For this grouping causes the formation of compounds with a retro system, characterized by a cyclohex-2-ene ring. It is true that H. O. Huisman has found a method for the conversion of this system into the desired cyclohex-l-ene system, but it proceeds via an acid chloride, which limits the possibilities greatly. Besides I. Heilbron states in Bull. Soc. Chim. France, page 92 (1958), that the isolation of the desired compound from the reaction mixture of the isomerisation often proceeds less smoothly and is expensive.

A process has been found now for the preparation of a compound of the vitamin A series, characterized in that a 1 - alkoxy - 7 - hydroxy-3,7-dimethyl-9-[2'6'6'-trimethyl-cyclohex-1'-ene-1'-yl] - nona-1,3,5,8 - tetraene is converted into vitamin A aldehyde by means of an acid.

Further it was found that the starting product can be prepared by coupling β-ionone with an organometal compound of an ether of 1-hydroxy-3-methyl-hexa-1,3-diene-5-yn, followed by partial reduction in the coupling product of the triple bond.

By these new processes the synthesis of vitamin A aldehyde takes place without the intermediary formation of a retro compound, which means a great advantage. It is surprising to see that the hexadienyn ether used as starting product, the preparation of which is the subject of the invention of Netherlands patent application 6403376, published Oct. 18, 1965, has proved to be so extremely suitable for the present synthesis, though intermediate products are formed with the above-mentioned grouping deemed unsuitable for the present purpose.

For preference a lower alkyl ether of 1-hydroxy-3-methyl-hexa-1,3-diene-5-yn, derived from an aliphatic alcohol with 1–6 carbon atoms, such as methanol, ethanol, isopropyl alcohol and t.butyl alcohol, is taken as starting material.

The coupling of the hexadienyn ether with the β-ionone takes place for instance by a Grignard or Nef reaction, in which a reactive organometal compound is prepared from the first-mentioned starting product. The β-ionone can also be coupled with the lithium compound of the hexadienyn ether or with another alkali metal or alkaline earth metal compounds thereof. After the coupling with β-ionone and possible liberation of the carbinol from the alcoholate the triple bond is partially reduced.

The coupling is performed in an inert, anhydrous organic solvent, for instance liquid ammonia, benzene and/or an aliphatic ether, such as ethoxy ethane, butoxy butane, dioxane and tetrahydrofuran. Sometimes it is to be preferred to use a mixture of solvents. By using at least 2 mol of organometal compound to 1 mol of β-ionone a higher yield can be obtained.

The reaction is preferably performed in nitrogen atmosphere at a temperature of from about −80° C., which is applied when use is made of liquid ammonia, to the boiling point of the solvent used. After decomposition of the formed metal compound of the coupling product, for example by the addition of water or ammonium chloride, while cooling, the carbinol can be isolated from the reaction mixture, for instance by extraction with a solvent, such as pentane, benzene or ether and can be possibly purified further by distillation or chromatography, for instance over $Al_2O_3$.

The thus recovered product is a 1-alkoxy-7-hydroxy-3,7 - dimethyl - 9-[2'6'6'-trimethyl-cyclohex-1'-ene-1'-yl]-nona-1,3,8-triene-5-yn of the formula:

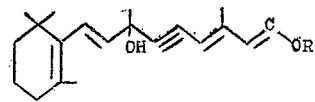
I

These compounds which have not yet been described in the literature before are characterized by their ultraviolet, infrared and NMR spectra. The U.V. spectra are characterized by $\lambda_{max}$:279 mμ. ε:28,000 (in alcohol). The infrared spectra show the following characteristic peaks in CCl₄ solution:

—OH at 3597 cm.⁻¹; weak
—C≡C— conjugated at 2200 cm.⁻¹; weak
—C=C— conjugated at 1625 cm.⁻¹; strong The NMR spectra are characterized by the following peaks:

| | Parts per million |
|---|---|
| 6′6′-dimethyl | 1.0 |
| 7-methyl | 1.58 |
| 2′-methyl | 1.68 | taken in CCl₄ solution with TMS as an internal standard. They can be reduced catalytically in a dissolved state, using for example platinum black, palladium-barium-sulphate, palladium-calcium-carbonate or palladium-carbon, at which possibly quinoline has been adsorbed first, as catalyst. A palladium catalyst partially poisoned with lead, too, as described for the first time by H. Lindlar in Helv. Chim. Acta 35, 446 (1952), is very suitable for the partial reduction of the triple bond to a double bond. After filtration of the catalyst and evaporation of the filtrate a 1 - alkoxy - 7 - hydroxy-3,7-dimethyl-9-[2′6′6′-trimethyl-cyclohex-1′-ene-1′-yl]-nona-1,3,5,8-tetraene is obtained of the formula:

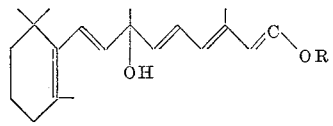

II

They are new compounds not yet described before in the literature, characterized by their ultraviolet, infrared and NMR spectra, having the appearance of a pale yellow oil. Their U.V. spectra are characterized by $\lambda_{max}$:284 m$\mu$. $\epsilon$:28,000 (in alcohol).

Their infrared spectra show the following characteristic peaks in CCl₄ solution:

—OH at 3600 cm.⁻¹; weak
—C=C— at 1632 cm.⁻¹; strong

Their NMR spectra are characterized by the following peaks:

| | P.p.m. |
|---|---|
| 6′6′-dimethyl | 1.0 |
| 7-methyl | 1.38 |
| 2′-methyl | 1.67 | taken in CCl₄ solution with TMS as an internal standard.

The reduction of the acetylene bond in the original carbinol can also take place in a very simple manner with a hydride, such as an alkali metal borohydride and an alkali metal aluminium hydride, preferably lithium aluminium hydride, and further with diethyl aluminium hydride and diisobutyl aluminium hydride, using for instance an etherial medium. When using such reducing agents the alcoholate need not first be converted into the carbinol, so that these agents are preferably used.

The reduced carbinol of the above Formula II is dissolved in an inert organic solvent and converted, in nitrogen atmosphere, into the orange vitamin A aldehyde by means of an acid, which product can be isolated and purified in a conventional manner.

This conversion, in which isomerisation and splitting off of alcohol takes place, is performed for instance at room temperature, but higher or lower temperatures are also possible. As acid may be used for instance an inorganic acid, such as sulphuric acid, hydrochloric acid and phosphoric acid, and further an organic acid such as oxalic acid. It is possible to apply a homogeneous system, consisting of a solution of the carbinol in a water-miscible organic solvent, such as an alcohol or dioxane and an aqueous solution of the acid, and a heterogeneous system, consisting of a non-water-miscible organic solution of the carbinol and an aqueous solution of the acid. In the latter case, which is preferably applied, the liquid phases must be mixed by shaking or stirring vigorously. After about half an hour to one and a half hour the reaction is complete. The use or tartaric acid is favourable.

After isolation from the reaction mixture and crystallisation the vitamin A aldehyde obtained was also identified by its absorption spectrum with the characteristic maximum at 381 m$\mu$ (in ethanol); log $\epsilon$=4.7. Melting point 61° C.

Further the yellow semi-carbazone was prepared from the vitamin A aldehyde obtained, melting at 206–208° C. while decomposing.

After mixing with an authentic sample the melting point did not fall. The absorption maximum was found to be at 381 m$\mu$; log $\epsilon$=4.7 in ethanol.

If desired, the vitamin A aldehyde can be converted into other biologically active compounds of the vitamin A series in a known manner.

The present synthesis is most suitable for a large-scale manufacture owing to its simplicity and high yield.

Example 1.—Vitamin A aldehyde

All the following processes take place in nitrogen atmosphere.

A solution of 0.1 mol of a mixture of cis and trans-isomers of 1-methoxy-3-methyl-hexa-1,3-diene-5-yn in 10 ml. of absolute ether is added dropwise, at 25° C., to 100 ml. of a 1-molar solution of butyl lithium in ether. After completion of the development of butane, the mixture is heated for 5 minutes to boiling temperature, after which it is cooled down to —30° C. Next a solution is added dropwise, while stirring, of 0.1 mol of β-ionone in 25 ml. of absolute ether. After standing for 1 hour the temperature of the mixture is allowed to rise to room temperature, after which it is decomposed with ice water. The etherial layer is washed with water, dried on anhydrous sodium sulphate and after that evaporated in vacuo. The remaining crude 1-methoxy-7-hydroxy-3,7-dimethyl-9[2′6′6′ - trimethyl - cyclohex - 1′-ene-1′-yl]-nona-1,3,8-triene-5-yn is a pale yellow oil. The infrared absorption spectrum shows a moderately strong band at 4.56$\mu$ from the triple bond in the molecule. The yield is quantitative.

The oil is dissolved without previous purification in 50 ml., of absolute ether and added to a mixture of 0.05 mol of lithium aluminium hydride and 200 ml. of absolute ether, the temperature rising to the boiling point of the ether. Next the mixture is heated for half an hour while stirring and refluxed. Next an excess of 3 N sulphuric acid is added, while stirring, when a deepening of the colour is observed. After stirring for 10 minutes the etherial layer is separated, washed with water and dried on anhydrous sodium sulphate. After evaporation in vacuo a dark yellow oil is obtained. A small portion of it is treated at boiling temperature with an aqueous alcoholic solution of semi-carbazideacetate. The yellow semicarbazone of vitamin A aldehyde crystallises on cooling down. Melting point: 207° C. The remaining quantity of the crude vitamin A aldehyde is dissolved in a 20 fold quantity of pentane and stored at —40° C., when "all trans" vitamin A aldehyde crystallises out. Melting point: 60° C.; $\lambda_{max}$ is 380 m$\mu$; log $\epsilon$=4.6 (in alcohol). The described reduction with lithium aluminium hydride in ether yields "all trans" vitamin A aldehyde in a yield of 58%.

Example 2.—Reduction with palladium catalyst

By the method of example 1 1-methoxy-7-hydroxy-3,7-dimethyl-9-[2′6′6′-trimethyl-cyclohex - 1′ - ene - 1′-yl]-nona-1,3,8-triene-5-yn is prepared, using, however, a 1-molar solution of ethyl magnesium bromide in absolute ether and performing the hydrolysis in which the free carbinol is formed, with an aqueous solution of ammonium chloride. The carbinol is dissolved in octane and shaken with a palladium carbon catalyst (10%) and hydrogen. Then hydrogenation is terminated as soon as 1 mol of hydrogen per mol of the carbinol has been taken up.

After filtration of the catalyst the further process takes place as described in Example 1. The vitamin A aldehyde is obtained in a less pure form and a 50% yield.

Example 3.—1-methoxy-7-hydroxy-3,7-dimethyl-1 - 9 - [2' 6'6'-trimethylcyclohex-1'-ene-1'-yl]-nona - 1,3,8 - triene 5-yn A. To a suspension of 1 mol of lithium amide in 2 l. of liquid ammonia was added 130 gm. of 1-methoxy-3-methyl-hexa- 1,3-diene-5-yn in 15 minutes while vigorously stirring. After stirring for another 30 minutes 1 l. of tetrahydrofuran was added gently. Then the ammonia was evaporated for the greater part. Next another half liter of tetrahydrofuran was added. After all the ammonia was evaporated a mixture of 96 gm. β-ionone in 300 ml. of tetrahydrofuran was added to the suspension at a temperature of about 5° C. After stirring for 1 hour 400 ml. of a saturated sodium chloride solution was added. The water layer was extracted with ether. The organic layers were washed with saturated sodium chloride solution. After drying on sodium sulphate the ether and the excess of 1-methoxy - 3 - methyl-hexa-1,3-diene-5-yn was evaporated in vacuo. The residue was washed with hexane and the impurities removed by filtration. After evaporation of the hexane 140 gm. of pure 1-methoxy-7-hydroxy-3,7-dimethyl-9 - [2'6'6' - trimethyl-cyclohex-1'-ene-1'-yl]-nona - 1,3,8 - triene-5-yn was obtained. $\lambda_{max}$: 279 m$\mu$; $\epsilon$: 28,400 (in ethanol); $n_D^{20}$: 1.5563.

B. To 15.66 gm. of magnesium in 175 ml. of dry ether was added 81.18 gm. of ethyl bromide in about 50 minutes. After 20 minutes' refluxing a solution of 71 gm. of 1-methoxy-3-methyl-hexa-1,3-diene-5-yn in 175 ml. of dry benzene was added. After refluxing for 30 minutes 98 g. of β-ionone in 230 ml. of dry ether was added in 10 minutes. After refluxing for 1 hour the complex was destroyed with 115 gm. of ammonium chloride in water. After extraction and the usual working up, a residue of 140 gm. pure 1-methoxy-7-hydroxy-3,7-dimethyl-1-9-[2'6'6'-trimethyl-cyclohex - 1' - ene-1'-yl]-nona-1,3,8-triene-5-yn was obtained. $\lambda_{max}$; 279 m$\mu$; $\epsilon$: 29,100 (in ethanol); $n_D^{20}$: 1.5568.

Example 4.—1-butoxy-7-hydroxy-3,7 - dimethyl - 9 - [2'6' 6'-trimethyl-cyclohex-1-ene-1'-yl]-nona - 1,3,8 - triene-5-yn To a suspension of lithium amide from 1.65 gm. of lithium in 400 ml. of liquid ammonia was added 2 gm. of 1-butoxy-3 methyl-hexa-1,3-diene-5-yn. After stirring for 30 minutes 15 gm. of β-ionone was added. After stirring for 16 hours at −32° C, 20 gm. of ammonium chloride was added. The ammonia was evaporated, after which water and ether were added. The extraction, and the usual working up of the extracts, gave 19 gm. of the 1-butoxy-7-hydroxy-3,7-dimethyl - 9 - [2'6'6' - trimethyl-cyclohex-1'-ene-1'-yl] - nona-1,3,8-triene-5-yn. $\lambda_{max}$; 279 m$\mu$; $\epsilon$: 27,500 (in ethanol).

Example 5.—1-ethoxy-7-hydroxy-3,7-dimethyl-9 - [2'6'6'-trimethyl-cyclohex - 1' - ene-1'-yl]-nona-1,3,8-triene-5-yn To a suspension of 0.1 mol of sodium amide in 150 ml. of liquid ammonia 0.1 mol of a mixture of cis and transisomers of 1-ethoxy-3-methyl-hexa-1,3-diene-5-yn is added. After stirring for 10 minutes a solution is added of 0.05 mol of β-ionone in 25 ml. of absolute ether. After evaporation of the ammonia water is added and the reaction mixture is extracted with ether. The etherial extract is repeatedly washed with water, dried and after that evaporated. By chromatography over basic aluminium oxide, in which first elution takes place with pentane, next with pentane containing 10% ether and finally with ether, the desired carbinol is obtained in the last eluate. It is a pale yellow oil, the infrared absorption spectrum of which shows among other things a moderately strong band at 4.56$\mu$.

Example 6.—1-(iso)propoxy-7-hydroxy - 3,7 - dimethyl-9-[2'6'6'-trimethyl-cyclohex - 1' - ene - 1'-yl]-nona-1, 3,8-triene-5-yn By the process of Examples 3B β-ionone was respectively coupled with 1-propoxy-3-methyl-hexa-1,3-diene-5-yn and 1-isopropoxy-3-methylhexa-1,3-diene-5-yn. The thus obtained carbinols are pale yellow oils showing a moderately strong band at 4.6$\mu$ in the infrared absorption spectrum.

Example 7.—Vitamin A aldehyde

By the method of Example 3B the reduction of the acetylene function in 1-isopropoxy-7-hydroxy-3,7-dimethyl-9-[2'6'6'-trimethyl - cyclohex-1'-ene-1'-yl]-nona-1,3,8-triene-5-yn was performed with lithium aluminium hydride. The reaction mixture processed in this manner yielded pure vitamin A aldehyde in a yield of 57%.

Example 8.—Vitamin A aldehyde

To a solution of 79 gm. of 1-methoxy-7-hydroxy-3,7-dimethyl-9-[2'6'6'-trimethyl - cyclohex-1'-ene-1'-yl]-nona-1,3,8-triene-5-yn in 500 ml. of dry ether was added a solution of 0.28 mol lithium aluminium hydride in 500 ml. of ether in 45 minutes at 0° C. After stirring for half an hour at 0° C., the reaction mixture was refluxed during 30 minutes. After cooling to 0° C. the reaction mixture was poured into 1 l. of ice water. To the mixture was next added a solution of 200 gm. of concentrated sulphuric acid in 1000 ml. of water at −5° C. and stirred for 45 minutes at room temperature, after which 400 ml. of pentane was added. After stirring for another 1.5 hours, the layers were separated. The orange organic layer was washed with ice water and dried on anhydrous magnesium sulphate. The pentane and ether were removed in vacuo at a bath temperature of 20–30° C. The orange coloured oil was dissolved in 150 ml. of pentane and cooled to −70° C. After adding a small quantity of the crystalline all-trans aldehyde, the solution was kept at −25° C. for several days. The crystalline powder was filtered off. After several crystallisations from pentane pure all trans vitamin A aldehyde was obtained with a yield of 60% calculated on β-ionone. Melting point: 62–62.5° C. $\lambda_{max}$ 381 m$\mu$; $\epsilon$: 43,000 (in ethanol).

The I.R.-spectrum was in complete agreement with that given by C.D. Robeson et al. J.A.C.S. 77, 4122 (1955). The same was the case with the N.M.R.-spectrum, as given by C.V. Planta et al. Helv. Chim. Acta XLV, 548 (1962).

Example 9.—Reduction with Lindlar catalyst

To a solution of 3 gm. of 1-methoxy-7-hydroxy-3,7-dimethyl-9-[2'6'6'-trimethyl-cyclohex - 1'-ene - 1'-yl]-nona-1,3,8-triene-5-yn in 30 ml. of cyclohexane was added 0.12 gm. of quinoline and 0.3 gm. of a Lindlar catalyst. After the theoretical amount of hydrogen was taken up, the mixture was filtered. The residue was washed with ether. Thereafter the organic layer was washed with 5 ml. of 1 N $H_2SO_4$ and with water to neutral. After evaporation of the solvent, the 1-methoxy-7-hydroxy-3,7-dimethyl-9-[2'6'6'-trimethyl-cyclohex-1'-ene-1'-yl]-nona - 1,3,5,8-tetraene was obtained with U.V. $\lambda_{max}$: 284 m$\mu$; $\epsilon$: 26,600 (in ethanol). Yield: 97%.

Example 10.—Vitamin A aldehyde

Dissolve 0.05 mol of 1-methoxy-7-hydroxy-3,7-dimethyl-9-[2'6'6'-trimethyl - cyclohex-1'-ene-1'-yl]-nona-1,3,5, 8-tetraene in 30 ml. of benzene and stir this solution vigorously for 2 hours in nitrogen atmosphere with an excess of a solution of oxalic acid in water at 50° C. The colour deepens to orange. The benzene layer is separated, dried and evaporated in vacuo. The yield of crude vitamin A aldehyde is practically quantitative.

Example 11.—Vitamin A aldehyde

Dissolve 0.05 mol. of 1-methoxy-7-hydroxy-3,7-dimethyl-9-[2'6'6'-trimethyl - cyclohex-1'-ene-1'-yl]-nona-1,3,5,8-tetraene in 50 ml. of methanol containing 1% by weight of $H_2SO_4$. The mixture is left to stand at room temperature for 4 hours, when the colour deepens to orange. After processing in the usual manner crude vitamin A aldehyde is obtained in a 61% yield.

Example 12.—Vitamin A aldehyde

To a solution of 16.46 gm. of 1-methoxy-7-hydroxy-3,7-dimethyl-9-[2'6'6'-trimethyl - cyclohex - 1'-ene-1'-yl]-nona-1,3,5,8-tetraene in 100 ml. of acetone was added at 0° C. 2.5 gm. of tartaric acid in 100 ml. of acetone in 5 minutes. After stirring for 30 minutes at 0° C., the reaction mixture was poured into 500 ml. of water and 500 ml. of a saturated sodium chloride solution. After extraction with ether, washing to neutral, drying and evaporation of the solvent, the crude vitamin A aldehyde was crystallised several times from pentane. The vitamin A aldehyde obtained had a melting point of 62–63° C. U.V. $\lambda_{max}$: 381 m$\mu$; $\epsilon$: 42,800 (in ethanol). Yield: 51% calculated on $\beta$-ionone.

We claim:
1. A compound of the formula:

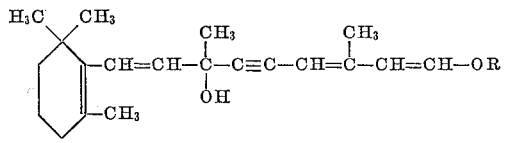

in which R represents an alkyl group of 1–6 carbon atoms.

2. The compound of the formula of claim 1, in which R is methyl.

3. A compound of the formula:

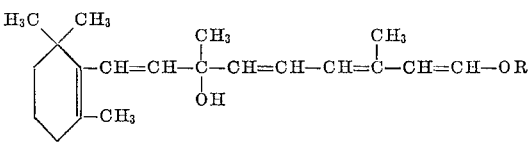

in which R represents an alkyl group of 1–6 carbon atoms.

4. The compound of the formula of claim 3, in which R is methyl.

References Cited

UNITED STATES PATENTS 2,628,979   2/1953   Arens et al. _____ 260—598

BERNARD HELFIN, *Primary Examiner.*